H. S. MAXIM.
LIQUID-METER.
No. 177,733. Patented May 23, 1876.
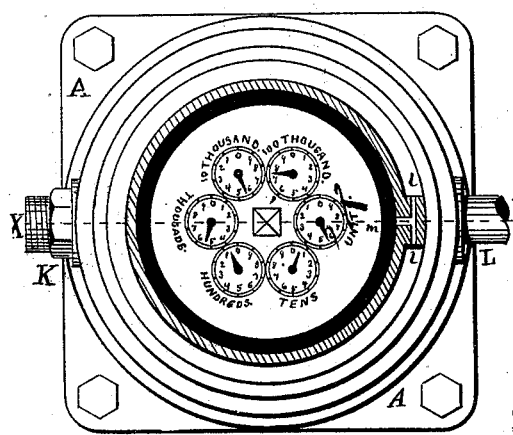
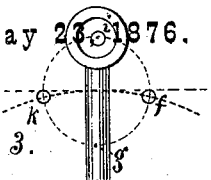
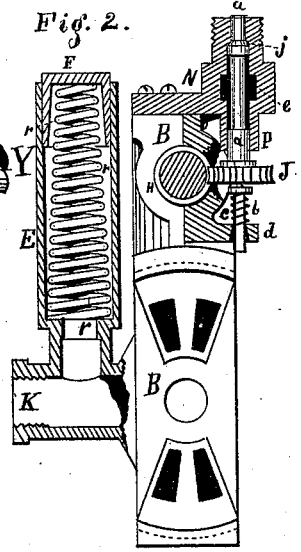
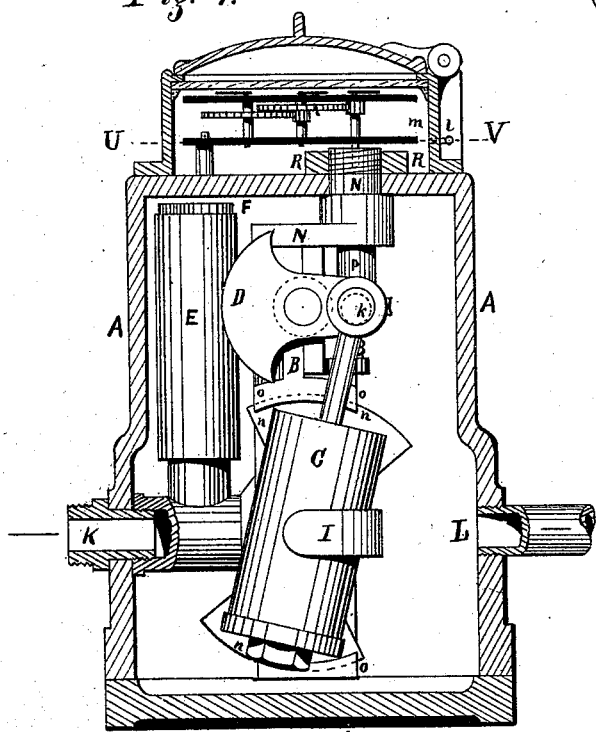
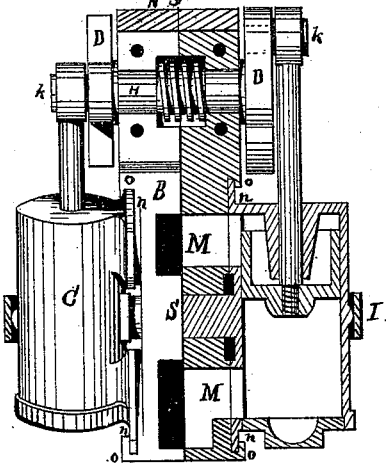
Witnesses;
A. T. Welch.
Frederic R. Noyes
Inventor.
Hiram S. Maxim.

UNITED STATES PATENT OFFICE.

HIRAM S. MAXIM, OF FANWOOD, NEW JERSEY, ASSIGNOR OF ONE-HALF HIS RIGHT TO ALONZO T. WELCH, OF BROOKLYN, NEW YORK.

IMPROVEMENT IN LIQUID-METERS.

Specification forming part of Letters Patent No. 177,733, dated May 23, 1876; application filed November 19, 1875.

*To all whom it may concern:*

Be it known that I, HIRAM S. MAXIM, of Fanwood, New Jersey, have invented a Liquid-Meter, of which the following is a specification:

The object of my present invention is to accurately measure and register the flow of water or other liquids, where the flow and pressure is unsteady, being at times very copious and under great pressure, while at other times the pressure may be low and the discharge very small. To register large streams without any jar or damage to the parts, and small streams, under a very low pressure, has been a great desideratum in meters, which is fully and cheaply met in this meter.

I am aware that piston-meters have been patented by Worthington and others, and that some have been made with two pistons connected to the same crank-shaft; also, that ocillating cylinders have been patented by myself; but all these have been imperfect, and all require certain conditions which are not always attainable.

The great fault with piston-meters has been the great jar and strain of the parts, when the pressure is great and the flow copious. Indeed, some piston-meters, that, with a moderate stream, might operate well for years, may be completely ruined in a few hours from a full stream under a high pressure. This fault is so common that the large makers recommend that meters be made larger, and bushed down for a full stream.

With piston-meters using no crank there is always some uncertainty as regards the length of stroke, and a consequent uncertainty as regards the quantity of liquid discharged, while, with crank-meters, there has been a trouble with an unequal or differential movement. By reference to Fig. 3 this matter will be clear. There is the same volume of liquid discharged while the crank is traveling through the arc $k\ i\ f$, as when it travels through the shorter arc $f\ g\ k$; therefore when the discharge of liquid is uniform, the movement of the working parts must be differential. To obviate this trouble is one of the objects of this invention, and it is effectually accomplished by the introduction of a third piston, operating in connection with a spring, which removes all jar and impact, and causes the flow and movements to be both uniform and noiseless.

I have also made an arrangement of gibs, which holds the face of the oscillating valves against their face with sufficient force to either sever an obstruction or stop the meter. This feature is very desirable where there are small fish and eels in the water. Another exceedingly important feature is the arrangement of a water-tight joint to prevent a leakage into the chamber containing the registering device. This, with a means of ventilating the said chamber, makes up the objects of my present improvements.

Figure 1 represents a plan of my meter, with the cap in section, showing the apertures for ventilation. Fig. 2 is the frame on which the cylinders oscillate; also, a vertical section of the spring-piston and the self-tightening spindle. Fig. 3 exhibits the oscillating cylinder. Fig. 4 shows a section of the outer case cut through X Y, and a side elevation of the working parts contained therein. Figs. 5 and 6 show the eccentric crank-pin. Fig. 7 represents the works partly in section and partly in elevation, one cylinder, and the gibs that hold it onto the frame, being in section.

The operation of this meter is as follows: The liquid enters the case A A at L, filling it completely, and entering the ports of the cylinders C C at M M it causes the crank-shaft to turn, and discharge said liquid through the outlet-pipe. The case A A should be made of some strong material, cast-iron being preferable, it being both cheap and strong, the operation of oscillating cylinders being so well known that an explanation is not necessary here. The water enters and circulates freely about all the movable parts, and has to turn the crank-shaft to get out of said case. The discharge answers as the exhaust when it is an engine. The pressure about the works serves in part to hold the valves to their faces. Both oscillating cylinders being attached to one crank-shaft, the said cranks being at right angles to each other and suitably counterbalanced, and the water being turned on, the works will run at a perfectly uniform speed, and with as little jar from impact of the water as though it were so much air.

The third cylinder E and its accompanying piston F remove all inequality whenever one or both of the oscillating cylinders are in that position when they are discharging the least water for degree traveled by the crank-pin, as on the arc $k\,i\,f$, Fig. 3. Then there is an increase of pressure on the inlet, and a diminished pressure on the outlet. Then the third piston F slides down, relieving the pressure of the inlet, and adding the same to the outlet, which is the exact amount required. Then, again, when the crank-pin is traveling on the arc $k\,g\,f$ there is a corresponding lack of pressure on the inlet, and an excess on the outlet, which is relieved and equalized by the spring in the cylinder E pressing the piston F upward. Therefore, it will be seen that by the use of the third cylinder a perfectly uniform discharge of liquid, and an equally uniform movement of the working parts, is attained.

N N is a casting which serves a three-fold purpose. It holds the works in position. It forms the air-tight connection between the water-chamber and the dry-chamber containing the registering device, and makes the bearings for the shaft of the worm-wheel J. $a$, Fig. 2, is a revolving shaft, provided with the worm-wheel J and valve $j$. There is a chamber in the casting N which surrounds shaft $a$, which is filled with tallow and plumbago, and serves to keep the valve $j$ lubricated and tight for a long time. The sleeve $p$ extends downward on the shaft, and thus prevents any lateral stress it may be subjected to from wrenching the valve $j$ from its seat. $c$ represents a small shaft surrounded by the spiral spring $b$, and held in its place by the projection $d$. The spring and shaft are free in the projection $d$, and are pivoted in the wheel J. They thus keep the valve $j$ in its place, and as the connection between them and J is not rigid any little spring in the parts in screwing up the lock-nut R will not throw the valve $j$ out of its seat or make it bind.

The oscillating cylinders are held in their place by the trunnions S and the lip of gibs $n\,n\,o\,o$. It is desirable that said gibs should be quite loose, so that, should any sand get on the face of the cylinder-valves, they may spring off and free themselves, while at the same time they will not spring off far enough to throw the cylinder off or make it bind should any large substance like a fish get into it. The pressure of the liquid about the cylinders has a tendency to keep them in place. They are also provided with the spring I, which holds them closely to their faces.

K K are the crank-pins, which are in the form of an eccentric, so that the stroke may be changed by rotating them in the crank.

$l\,l\,m$ is a peculiar arrangement of holes drilled in the hinge of the case which covers the dial and registering-gear. Their object is to ventilate the dry-chamber, and at the same time not to allow of a wire or other instrument being inserted by evil-disposed persons. Ventilation is necessary to prevent sweating or condensation on the inside of glass, which would make it difficult to take a statement of the meter.

What I claim as new, and do not believe to have been known or used before, is—

1. In liquid-meters, the relief or equalizing cylinder E, piston F, and spring $r$, when used in the manner and for the purpose herein shown and described.

2. The combination of worm-wheel J, shafts $a$ and $c$, spring $b$, and valve $j$, when constructed in and operated for the purpose herein specified and set forth.

3. The combination of two oscillating cylinders operating one crank-shaft with the lips or gibs $n\,n\,o\,o$.

4. The arrangement of holes $m\,l\,l$ in the hinge of case, for the purpose set forth.

5. The combination of the oscillating cylinders G G, the casting N, cylinder E, piston I, and spring $r$, when operating in conjunction, and for the purpose herein shown and described.

HIRAM S. MAXIM.

Witnesses:
A. T. WELCH,
FREDERIC R. NOYES.